(12) United States Patent
Roberts et al.

(10) Patent No.: US 7,183,663 B2
(45) Date of Patent: Feb. 27, 2007

(54) PRECISELY CONTROLLED FLYING ELECTRIC GENERATORS

(76) Inventors: Bryan William Roberts, 12 Fernhill Avenue, Epping, NSW (AU) 2121; David Hammond Shepard, 35 Aruba Bend, Coronado, CA (US) 92118

( * ) Notice: Subject to any disclaimer, the term of this patent is extended or adjusted under 35 U.S.C. 154(b) by 91 days.

(21) Appl. No.: 10/919,543

(22) Filed: Aug. 17, 2004

(65) Prior Publication Data

US 2005/0017515 A1    Jan. 27, 2005

Related U.S. Application Data

(63) Continuation-in-part of application No. 10/273,060, filed on Oct. 17, 2002, now Pat. No. 6,781,254.

(30) Foreign Application Priority Data

Nov. 7, 2001    (AU) .................................... PR8712

(51) Int. Cl.
*F03D 7/00*    (2006.01)
(52) U.S. Cl. ......................................... 290/44; 290/55
(58) Field of Classification Search .................... None
See application file for complete search history.

(56) References Cited

U.S. PATENT DOCUMENTS

| | | | | | |
|---|---|---|---|---|---|
| 4,073,516 A | * | 2/1978 | Kling | ........................... | 290/55 |
| 4,166,596 A | * | 9/1979 | Mouton et al. | ................. | 244/30 |
| 4,251,040 A | * | 2/1981 | Loyd | .......................... | 244/154 |
| 4,285,481 A | * | 8/1981 | Biscomb | ...................... | 244/33 |
| 4,486,669 A | * | 12/1984 | Pugh | ........................... | 290/44 |
| 4,491,739 A | * | 1/1985 | Watson | ........................ | 290/44 |
| 4,659,940 A | * | 4/1987 | Shepard | ....................... | 290/55 |
| 5,909,859 A | * | 6/1999 | Janicki | .................. | 244/153 A |
| 6,072,524 A | * | 6/2000 | Davis et al. | ................ | 348/164 |
| 6,253,781 B1 | * | 7/2001 | Lee | ............... | 137/12 |
| 6,327,994 B1 | * | 12/2001 | Labrador | ..................... | 114/382 |
| 6,523,781 B2 | * | 2/2003 | Ragner | .................. | 244/153 R |

FOREIGN PATENT DOCUMENTS

| | | | | |
|---|---|---|---|---|
| DE | 3628133 | A1 | * | 2/1988 |
| EP | 45202 | A1 | * | 2/1982 |
| EP | 391601 | A2 | * | 10/1990 |
| FR | 2667904 | A1 | * | 4/1992 |
| GB | 489139 | A | * | 7/1937 |
| WO | WO 9913221 | A1 | * | 3/1999 |

* cited by examiner

*Primary Examiner*—Joseph Waks

(57) ABSTRACT

One or more tethered platforms, each having three or more, mill rotors, are operated at altitudes in relatively high winds to generate electricity. These windmill kites use one or more electro-mechanical tethers on each platform. Their position, attitude and orientation are monitored by one or more GPS receivers and/or gyros and controlled through differential thrusts and torque-reactions produced by the mill rotors. The kites can be electrically powered from a ground supply during relatively calm periods, or landed if desired. During windy periods the kites may be used to generate electricity by tilting the rotors at an angle, or incidence to the oncoming wind. In this generate mode the mill rotors simultaneously develop thrust while generating electricity.

5 Claims, 2 Drawing Sheets

PRECISELY CONTROLLED FLYING ELECTRIC GENERATORS

CLAIM OF PRIORITY

This application is a continuation-in-part application and claims priority from and the benefit of U.S. application Ser. No. 10/273,060 titled Windmill Kite filed Oct. 17, 2002 now U.S. Pat. No. 6,781,254 which in turn claims priority from and the benefit of Australian application No. PR 8712 filed Nov. 7, 2001.

BACKGROUND OF THE INVENTION

1. Field of the Invention

This invention relates to windmills, that is to say apparatus that include a wind driven rotor and are used to convert the kinetic energy of the wind into useful work or other forms of energy.

More particularly, the invention relates to such apparatus wherein the rotor is incorporated in a kite, that is to say a tethered flying platform that may be supported entirely by its interaction with a wind of appropriate strength. Apparatus of that kind is referred to as a windmill kite herein.

2. Prior Art

A windmill kite comprising a high flying platform incorporating two wind driven rotors, two dynamos mounted on the platform respectively driven by the rotors, three tensile tethering lines extending from the platform to ground level anchorages and conductive cables connecting the dynamos to a ground-based electricity transmission system or other electric load, has been previously proposed by the present inventor and others.

The term "dynamo is used in the preceding paragraph and hereinafter in its generic sense as a machine for converting mechanical energy into electrical energy, or vice versa. The term designates a reversible machine; any dynamo may be used either as a generator or as a motor. Moreover, the term covers both AC and DC machines.

The purpose of incorporating the wind driven rotors in a kite is to enable them to be positioned at a high altitude where relatively strong and continuous winds may be expected to be found.

Each wind driven rotor (referred to simply as "a mill rotor" hereinafter) comprises a rotatable hub and a plurality of equi-angularly spaced blades extending radially from the hub. Preferably each blade is of aerofoil section and blade pitch control means are provided whereby the angle of attack of the blades may be adjusted from time to time.

Mill rotors are also reversible machines. On the one hand, wind directed through the swept area of the blades induces a continuous rotor torque, enabling the mill rotor to, for example, drive an associated dynamo as a generator. On the other hand, rotation of the mill rotor in still air by a dynamo acting as a motor induces a continuous air flow through the swept area producing a thrust force, enabling the mill rotor to, for example, lift itself and the dynamo from the ground.

That previously proposed windmill kite was described and evaluated in a paper entitled "Flying Electric Generator to Harness Jetstream Energy" delivered by the present inventor to the "Space 2000" Conference of the American Society of Civil Engineers held at Albuquerque USA in February–March 2000, and is presently available in the published proceedings of that Society at pp 1020–6.

The windmill kite described in that paper comprised an elongate flying platform including two outrigger mill rotors disposed symmetrically on each side of the longitudinal centre line of the platform. Each mill rotor was connected by a geared drive-transmission connecting it to a dynamo carried by the platform.

The flying platform, as illustrated in that paper, has a leading end and a trailing end relative to the direction of the wind, with adjustable but essentially fixed, preferably aerofoil, control surfaces at the ends of the platform. Those control surfaces are intended to ensure that the leading end of the platform is directed into the wind and that a transverse axis extending through the centers of the mill rotors remains substantially horizontal. Those control surfaces are also intended to ensure that the relative elevations of the ends of the platform are maintained so as to produce a substantially constant pitch angle for the platform as a whole, at which the wind flows obliquely against the undersides of the mill rotors.

As described in that paper, under those circumstances a drag force acts upon the mill rotors and platform, and a thrust force having an upward component and a torque are developed by each mill rotor. The upward component of the thrust forces and drag forces are opposed by the weight of the platform and the items carried by it and by tension in the tethering lines extending from the platform to ground level anchorages.

Those anchorages include a winch or winches that enable the flying height of the platform to be adjusted as needed.

The torque reactions from the mill rotors acting on the platform are cancelled out by ensuring that the mill rotors rotate in opposite directions. The generated torque is used to drive the dynamo or dynamos when operating in the generator mode.

A major problem with that prior proposal arises from the fact that, even at high altitudes, winds sometimes fail to blow with sufficient strength to enable those control surfaces to adequately stabilize the flying platform against variables such as wind gusts or eddies. Thus, should the wind fail, it has been necessary for the platform to be winched down to prevent the tethering lines and/or conductive cables from becoming tangled, and, in a worst case scenario, to prevent the platform from crashing. Winching the platform down and subsequently returning it to an operating altitude is a time consuming and expensive operation.

SUMMARY OF THE INVENTION

An object of the invention is to provide a windmill kite for generating electrical power from wind energy that overcomes the previously found problem of platform stability at times of weak or no wind.

Another object is to lessen the need to winch the platform down at times of calm.

The invention achieves the first mentioned object by dispensing with static, albeit adjustable, control surfaces;

providing at least three strategically placed mill rotors;

providing blade pitch control means to independently control the angle of attack of the blades of each of the mill rotors, to thereby stabilize the platform irrespective of whether the dynamos are functioning as generators or as motors for the time being.

The invention achieves the second mentioned object by enabling electric power to be delivered to the dynamos so that they may function as motors and drive the mill rotors for short periods to enable the platform to stay aloft.

Therefore, according to one aspect, the invention consists in a windmill kite of the kind comprising a flying platform including a plurality of mill rotors, at least one tethering line maintaining the platform at a substantially fixed geographical location, at least one dynamo on the platform drive-connected to said mill rotors, and conductor means connecting said at least one dynamo to an electrical transmission and supply system at ground level, characterized in that;

there are at least three substantially axially co-directed, spaced apart mill rotors disposed in an array which is symmetrical in terms of thrust capacity about each of two orthogonal axes, namely an X axis extending longitudinally of the platform, and a Y axis extending transversely of the platform, and is neutral in terms of torque capacity about a third orthogonal axis, namely a Z axis perpendicular to the X and Y axes; and in that blade pitch control means provide for adjustment of the angles of attack of the blades of the respective mill rotors, to thereby stabilize the platform in a desired attitude and orientation relative to the wind direction.

The symmetry of the array ensures that in normal steady state operating conditions there is no tendency for the platform to roll about the X axis, pitch about the Y axis or rotate about the Z axis. However the individual adjustment of the mill rotors in respect of thrust and torque enables corrective pitch, roll and orientation movements to be induced to cancel adventitious variations.

Preferably the origin of the three axes coincides with the centre of gravity of the platform as a whole.

Theoretically, the requisite symmetry of the array may be achieved by as few as three mill rotors in the array, for example an array wherein a mill rotor that has twice the thrust and torque generating capacity of each of the others coincides with say the X axis and is spaced forwardly of the origin, and the others are equally spaced from the X axis in the Y axis direction and are spaced rearwardly of the origin to the same extent as the first mentioned rotor is spaced forwardly thereof.

However, for the sake of simplicity it is preferred that all of the mill rotors be of equal weight and capacity, in which event there are at least four mill rotors in the array. Preferably the array is a square or rectangular, that is to say each mill rotor is positioned at a respective corner of a notional square or rectangle with its centre point coinciding with the origin of the X, Y and Z axes. In such arrangements it is also preferred that each mill rotor has an associated dynamo and is substantially co-axial therewith.

In large scale embodiments of the invention the ground level load would be a sub-station of a ground-based electricity transmission or distribution system. In that event the windmill kite may operate as a pollution free, base load generator, continuously feeding into the system, with more easily regulated fuel powered or hydro stations contributing to the system at peak load times, and enabling the kite to, draw power from the system when and if needed. Under those circumstances a plurality of geographically widely spaced windmill kites may be connected to the one ground transmission system to provide a reliable input for the system as a whole.

According to a second aspect, the invention consists in a method of stabilizing the platform of a windmill kite according to the first aspect of the invention by independently adjusting the angle of attack of the blades of the respective mill rotors in the said array.

It is mentioned that the mill rotors of the arrays referred to above are essential for stability control, nevertheless there may be further, possibly non-adjustable, mill rotors in other embodiments of the invention, providing those further rotors are paired and designed to be thrust moment and torque neutral with respect to the relevant X, Y and Z axes.

BRIEF DESCRIPTION OF THE DRAWINGS

By way of example, two embodiments of the invention are described in more detail hereinafter with reference to the accompanying drawings.

DETAILED DESCRIPTION OF THE INVENTION

Best Mode of Putting the Invention into Effect

Both of the illustrated windmill kites display a square, planar array of four substantially identical, axially parallel mill rotors, incorporated in a kite platform. In both instances the centers of the sets of rotating blades coincide with respective corners of a notional square defining the array. In other embodiments the square array may be replaced by a rectangular array. The two kites differ in their desired platform orientations with respect to the wind direction, which is indicated by the horizontal arrows W appearing in the respective figures.

The orientation and attitude of the respective embodiments may be described with reference to rectangular co-ordinate axes X, Y and Z appearing in the figures. In each instance the X and Y axes lie in a plane including the centers of the four sets of rotor blades, and the Z axis is, of course, perpendicular to that plane.

In both embodiments the kite comprises a platform frame carrying the four mill rotors.

Figure 1:
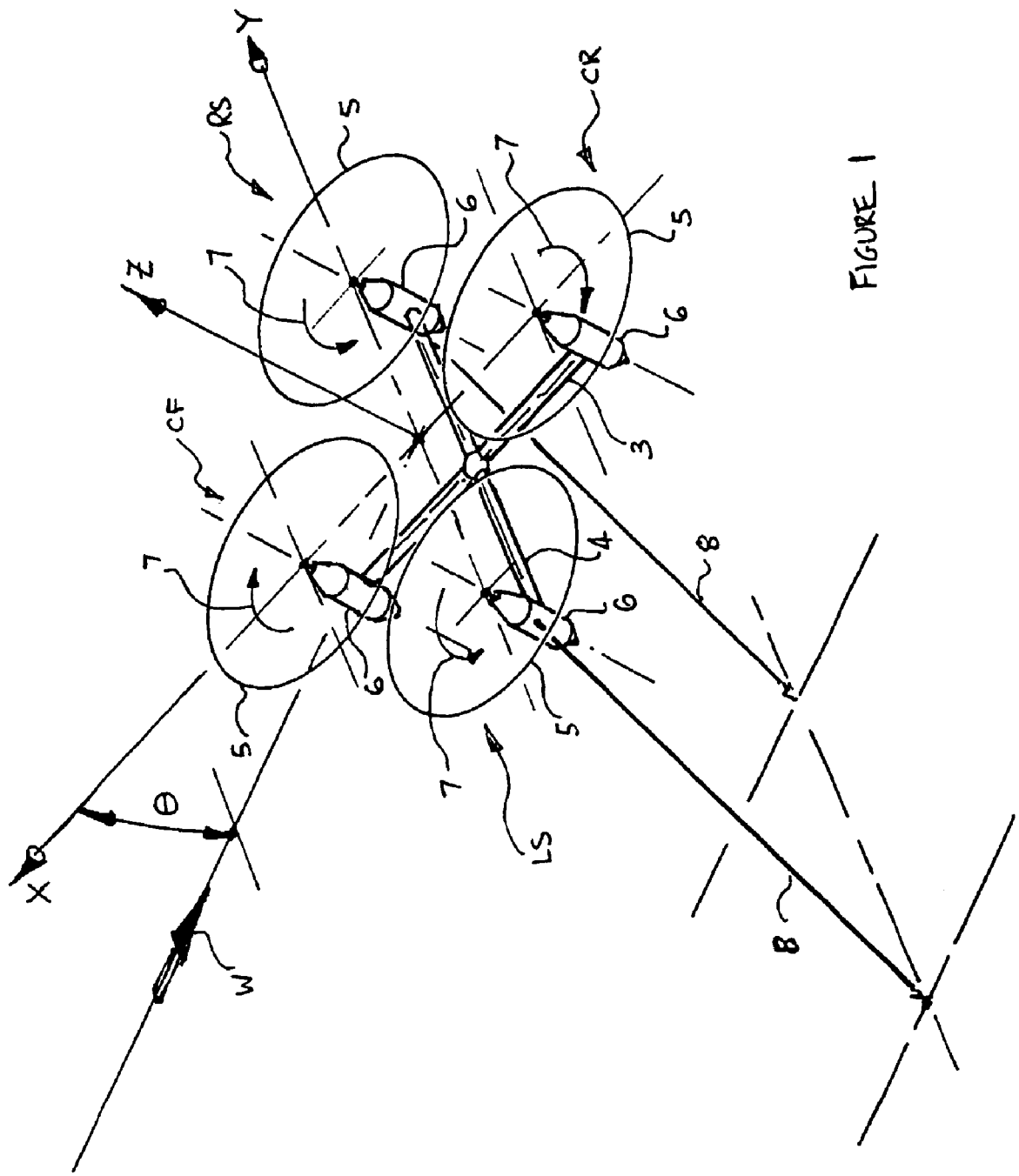
FIG. 1 is a diagrammatic isometric view of a windmill kite according to the invention.

FIG. 1 illustrates an embodiment wherein the platform frame comprises a cross, formed of two members, namely member 3, which is parallel to the X axis, and member 4, which is parallel to the Y axis.

The kite is shown in the figure in the desired operating orientation and attitude wherein the X axis, and therefore the member 3, is directed into the wind at an upward angle .theta. to the horizontal, and the Y axis, and therefore the member 4, is horizontal. This ensures that the wind impinges similarly on the undersides of all four mill rotors.

The angle .theta. may have a predetermined value or may be set depending on the wind velocity at the time.

Thus the FIG. 1 kite, when in the desired orientation may be regarded as facing the wind and may be said to have a centre front mill rotor CF, a centre rear mill rotor CR, a left side mill rotor LS and a right side mill rotor RS.

Each mill rotor comprises a plurality of rotatable aerofoil blades (indicated by the circles 5 defining the swept areas) on a shaft extending from a nacelle 6 enclosing a gear box, a dynamo connected by that gear box to the shaft and a control mechanism whereby the angle of attack of the rotor blades may be varied in response to control signals fed to the control mechanism.

The directions of rotation of the respective mill rotors are indicated by the arrows 7.

Each mill rotor is conventional in that it is analogous to corresponding rotors of helicopters, except for the presence of the dynamo, and requires no further description herein. Similarly, the major operating and control equipments are freely available components or systems, or are modifications of such components or systems.

In the case of a helicopter the control signals may be originated by the pilot, whereas according to the invention those signals are error signals generated by conventional gyro control mechanisms in consequence of deviations in the orientation and attitude of the platform from the desired position. Those deviations may be determined by reference to co-ordinates X and Y as established by two gyros, and a wind vane or other sensor responsive to wind direction. Briefly stated, if the tilt angle of frame member 3 departs from theta. then an X axis gyro generates an error signal indicative of the magnitude and direction of the departure. Similarly, if the frame member 4 departs from the horizontal then a Y axis gyro generates a similar signal. If the platform as a whole rotates about the Z axis then the angular deviation in the horizontal plane of say the frame member 3 from the wind direction established by the wind vane results in an error signal indicative of that deviation.

At times the wind may drop to a velocity that is insufficient to ensure that the wind vane or other sensor responsive to wind direction is effective. Thus a back-up gyro may be controlled to cut-in at a predetermined low wind speed and take over from the wind vane as a reference device until the wind speed rises to the predetermined value. That back-up gyro is mounted about the Z axis and may be set either to establish a constant reference direction, corresponding with the prevailing wind direction at the geographic location of the platform, or re-set when brought into operation to the then existing reference direction as indicated by the wind vane or its equivalent sensor.

One alternative method for generating one or more of the error signals used determine the corrective action necessary to maintain the invention in the desired position, altitude, pitch, roll and/or yaw is by use of one or more Global Positioning System ("GPS") receivers. In a preferred embodiment of the invention, at least four GPS receivers are positioned some distance apart to the fore, aft, port and starboard of the windmill kite. Each such receiver receives signals from orbiting satellites and uses those signals to determine the receiver's position. Because the signals to the various receivers are transmitted along virtually the same path, the relative determined positions of each receiver with respect to the other receivers are accurate enough to provide very precise attitude and position information. The attitude and position information of each GPS receiver is made available to the control equipment. Although the use of at least four GPS receivers is preferred, a lesser number may be used. For example, a single receiver may be used to determine position and altitude information. As another example, a pair of receivers spaced apart to the fore and aft or to the port and starboard of the windmill kite may be used to determine position, altitude, yaw, and pitch or roll respectively. As another example, three receivers spaced apart, for example, to the fore, aft and either port or starboard, or alternatively, to the port, starboard and either fore or aft may be used to determine position, altitude, yaw, pitch and roll of the windmill kite, however, such determinations made using inputs from only three receivers may not be as accurate as such determinations made using inputs from four receivers.

The GPS receiver system also may be combined with a gyro system of the type described above. In the event of a failure or momentary indecision of the GPS receiver system, for example, due to reflection induced ambiguity, the control processor may rely on the signals from the gyro system for attitude information which may be real time or stored from the immediate past.

The error signals are processed by the control mechanism to determine what, if any, corrective action is necessary. The output of the control mechanism is directed to servo-mechanisms or other known alternatives, which produce corrective actions, as are described more fully below.

In helicopters, particularly single rotor helicopters, it is well known to utilize cyclic pitch control to modify the thrust vector of a rotor to control the forward movement and rise or fall of the aircraft. In that form of control the angles of attack of the individual blades are varied in a cyclic manner during each revolution of the rotor. While cyclic pitch control could conceivably be used to establish and maintain a kite platform in the desired attitude and orientation, it is inappropriate for use in windmill kites to be used as electric power stations. This is because the repetitive stress cycles imposed by cyclic pitch control on the complex control mechanisms and the rotor structure, produces a fatigue life that is too short for use in a situation where the apparatus is required to run unattended for long periods, if it is to be economic.

Thus in accordance with the invention collective pitch control is utilized. That is to say, all of the blades of each mill rotor run with the same instantaneous angle of attack, but which may be adjusted from time to time as needed for control purposes. Moreover, according to preferred embodiments a modified form of collective pitch control, which may be termed differential collective pitch control, is employed. This concept implies control by two, spaced apart, mill rotors acting in concert, wherein an adjustment of the angle of attack in respect of one of the mill rotors by an increment is effected simultaneously with an adjustment of the angle of attack in respect of the other mill rotor by a correspondingly effective decrement. Thus the overall magnitude of the thrust force, for example, developed by the two mill rotors is unchanged by the adjustment; but, as the individual forces are changed and are spaced apart, a turning moment is applied to the platform as a whole.

Thus, by referring to FIG. 1 one can appreciate that correcting unwanted rolling of the platform (that is rotation about the X axis) may be effected by incrementally increasing the thrust force developed by one of rotors RS and LS while simultaneously decrementally decreasing the thrust force developed by the other. Which of the pair would be selected for an increase in thrust and which for a decrease would of course depend on the direction of the initial unwanted roll.

On the other hand correcting for unwanted pitching of the platform (that is, rotation about the Y axis) would be attained by similarly adjusting the thrust forces developed by the rotors CF and CR.

As for correcting the orientation of the kite, it will be noted that rotors CF and CR rotate in one direction and rotors RS and LS rotate in the opposite direction. Under steady state operating conditions, wherein all rotors are developing equal magnitude torques, this ensures that the torque reactions on the platform are cancelled out. However if adjustment of the orientation of the platform about the Z axis is required, incremental increase in the torque developed by, say, rotors CF and CR accompanied by decremental decrease of the torque developed by rotors LS and RS will unbalance the torque reactions, without altering overall thrust, so causing the platform to rotate about axis Z. Once again the choice as to which pair of rotors are adjusted incrementally and which pair are adjusted decrementally depends on the direction of the initial perturbation. When the dynamos are acting as motors, the adjustment required is in the opposite direction to that required when the dynamos are acting as generators. This requirement is incorporated into the programmable logic of control system.

For all of the corrections the controlling servo-mechanism would be appropriately damped to cause rapid decay of oscillating movement to each side of a zero error position.

Thus the original error is quickly corrected and the platform rapidly halts in the desired position.

Preferably the tethering lines and the conductor means are physically combined into single cables 8. Each cable 8 preferably extends from respective anchorages on the platform positioned on the Y axis equi-distantly from the origin and preferably higher than the centre of centre of gravity of the platform as a whole, to winch means at ground level enabling the kite to be reeled in or let out to adjust its altitude as may be needed.

Each cable 8 may have a high-strength, pliable core, for example of Kevlar fibers, surrounded by a conductive sheath, for example of braided aluminum filaments.

In the event that the kite produces a high voltage DC output, which is preferred, at least two such cables are required. In the event that three-phase AC output is produced, three cables are required. Bare conductors are preferred with separation of the cables being relied upon to insulate them from each other. This may require widely spaced winches at the ground. It may also require winches that are self-contained units, electrically isolated from each other and from the ground.

Those last mentioned requirements may be avoided by the use of a single tensile tethering line in physical combination with two mutually insulated conductive strands. Alternatively two cables such as cables 8 may be connected to a single tensile and conductive tethering cable at a junction box on or closely below the platform.

Alternatively, a single composite cable may be used to tether the windmill kite to the ground and to transmit electricity. For example, such a single tether may be constructed from a Vectran® composite strength member with two or more integrated aluminum conductors insulated to 10 kV each, providing a total of 20 kV dielectric between the conductors. Alternative materials known in the art may be substituted for the strength member and the conducting members. It is preferred that the weight requirement of the tether be approximately 0.4 lbs/kW/1000 feet although a composite cable of up to approximately 0.8 lbs/kW/1000 feet may be used. The composite cable may have a covering or not. The conductors may be located under the strength member coating or the conductors may be external. The conductors may be wrapped in a helix around the strength member. Placement of the conductors at or near the surface of the cable may eliminate or reduce any icing of the cable. If a single composite cable is used, that cable may be attached to the frame of the windmill kite through one or more shorter tethers attached to the frame at locations designed to distribute the tether load to near the terminal ends of the frame thus, reducing the stress on the frame.

As mentioned above, the kite is preferably connected to feed into a distribution system including other power sources. This enables the rotors to be driven by the dynamo or dynamos to lift the platform into position if need be, and to maintain it in position if the wind fails for what may be forecast to be a relatively brief period.

Figure 2:
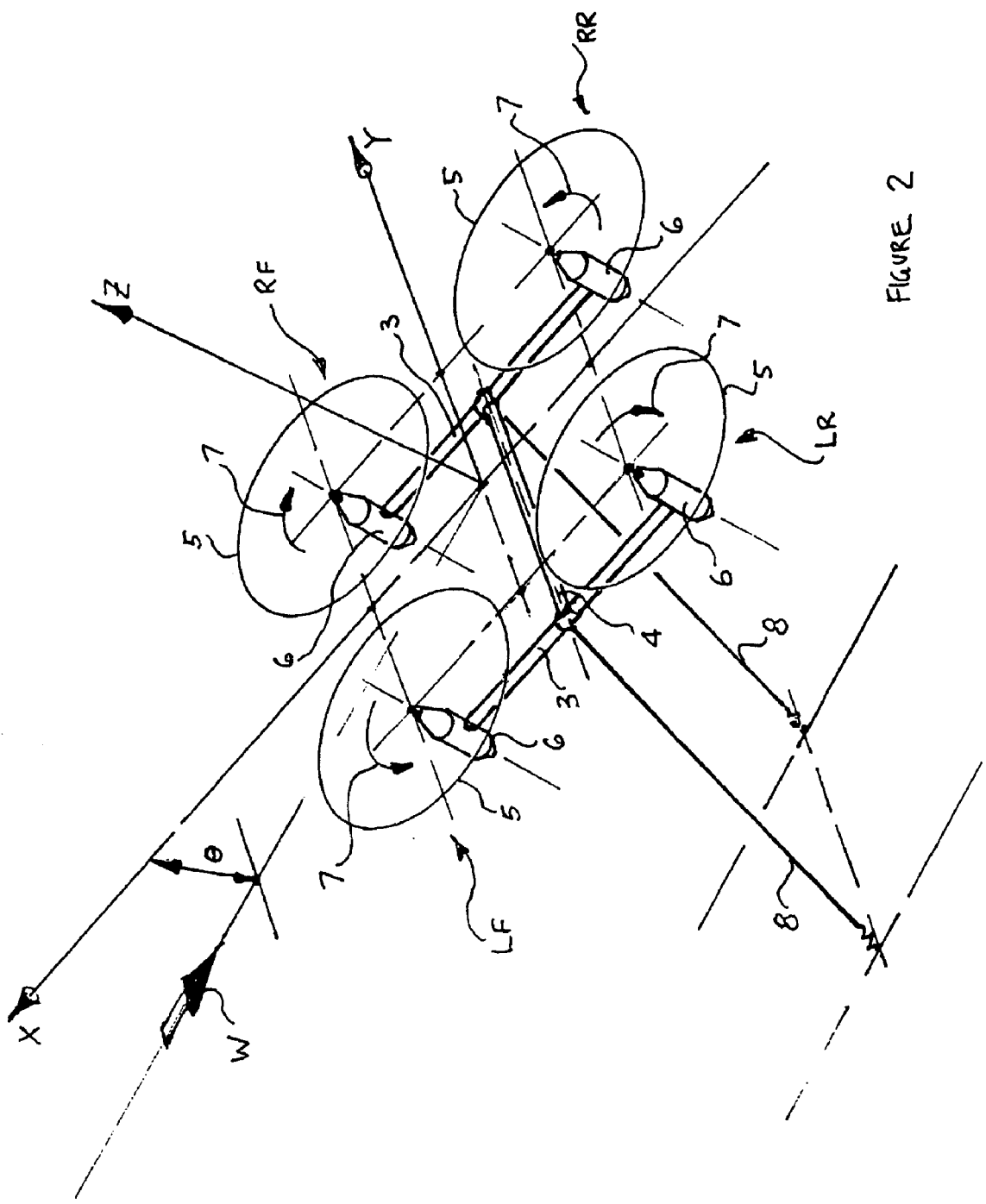
FIG. 2 is a view similar to FIG. 1 of another windmill kite according to the invention.

The kite illustrated by FIG. 2 is essentially the same in its individual components as that of FIG. 1 and need not be described in detail. Similar components are similarly numbered in the two figures.

It will be seen, however that the notional square of the rotor array, is differently oriented with respect to the wind direction. In this instance a side of the notional square rather than a corner faces the wind. Thus the X axis extends through the mid-points of two opposite sides of the square, the Y axis extends through the mid-points of the other two sides, and the Z axis extends, of course, through the intersection of the X and Y axes perpendicular to the plane of the notional square.

Thus, in this instance, the four mill rotors of the control array may be referred to as the right front rotor RF, the left front rotor LF, the right rear rotor RR and the left rear rotor LR. This reorientation is achieved merely be rotating the kite platform of FIG. 1 by 45.degree. about its Z axis in a clock-wise direction, as seen from above, relative to the wind direction.

In this embodiment, to adjust pitch of the platform, the angles of attack of the blades of rotors LF or RF (or both of them) are incrementally adjusted and at the same time the blades of rotors LR or RR (or both of them) are decrementally adjusted, or vice versa depending on the direction of the initial perturbation.

Likewise for adjustment of roll, the blades of rotors LF or LR (or both of them) are adjusted in one direction and the blades of rotors RF or RR (or both of them) are adjusted in the opposite direction.

To adjust orientation, the torque developed by rotors LF and RR may be incremented and that of rotors RF and LR decremented, or vice versa.

It will be appreciated that the square array of both of the illustrated embodiments may replaced by a rectangular array without significant change to the stabilizing control mechanisms of the invention as described above.

It should also be mentioned that in all embodiments of the invention, the front mill rotors may be displaced in the Z axis direction relative to the rear mill rotors to a small extent, to thereby lessen possibly disadvantageous effects due to disturbed air in the washes from the front mill rotors impinging on the rear mill rotors.

Although preferred embodiments of the invention have been disclosed herein in detail, it is to be understood that this is for the purpose of illustrating the invention, and should not be construed as necessarily limiting the scope of the invention since it is apparent that many changes can be made by those skilled in the art while still practicing the invention claimed herein.

What is claimed is:

1. A windmill kite comprising: at least three substantially axially co-directed, spaced apart mill rotors connected to at least one gear box; at least one dynamo connected to an output of said gear box; a frame for supporting said at least one gear box and said at least one dynamo; at least one composite cable connected to said frame for controlling the altitude and location of said windmill kite and for transmitting electricity to and from said windmill kite; means for determining the attitude of said frame relative to a fixed set of orthogonal axes; means for changing the attitude of said frame relative to a fixed set orthogonal axes and wherein said means for determining the attitude of said frame relative to a fixed set of orthogonal axes comprises at least two Global Positioning System receivers.

2. The windmill kite of claim 1 wherein said means for determining the attitude of said frame relative to a fixed set of orthogonal axes further comprises at least one gyro.

3. The windmill kite of claim 1 wherein the means for changing the attitude of said frame relative to a fixed set of orthogonal axes comprises differential collective pitch control.

4. A windmill kite comprising: at least three substantially axially co-directed, spaced apart mill rotors connected to at least one gear box; at least one dynamo connected to an output of said gear box; a frame for supporting said at least one gear box and said at least one dynamo; at least one composite cable connected to said frame for controlling the altitude and location of said windmill kite and for transmitting electricity to and from said windmill kite; means for determining the attitude of said frame relative to a fixed set of orthogonal axes; means for changing the attitude of said frame relative to a fixed set of orthogonal axes and wherein said means for determining the attitude of said frame relative to a fixed set of orthogonal axes comprises at least one gyro.

5. The windmill kite of claim 4 wherein the means for changing the attitude of said frame relative to a fixes set of orthogonal axes comprises differential collective pitch control.

* * * * *